United States Patent [19]

Dienes et al.

[11] 3,731,224
[45] May 1, 1973

[54] COMPENSATED FOLDED RESONATOR

[75] Inventors: Andrew Dienes, Middletown; Erich Peter Ippen, Red Bank; Herwig Werner Kogelnik, Fair Haven; Charles Vernon Shank, Laurence Harbor, all of N.J.

[73] Assignee: Bell Telephone Laboratories, Incorporated, Murray Hill, N.J.

[22] Filed: June 17, 1971

[21] Appl. No.: 154,087

[52] U.S. Cl. ................................................. 331/94.5
[51] Int. Cl. ............................................. H01s 3/08
[58] Field of Search ................. 331/94.5; 250/199

[56] References Cited

UNITED STATES PATENTS

| 3,293,565 | 12/1966 | Hardy | 331/94.5 |
| 3,443,243 | 5/1969 | Patel | 331/94.5 |
| 3,622,907 | 11/1971 | Tomlinson | 331/94.5 |

OTHER PUBLICATIONS

Maydan, Fast Modulator for Extraction of Internal Laser Power. J. Appl. Phys., Vol. 41, No. 4 (March 1970) pp. 1552–1559

Primary Examiner—William L. Sikes
Attorney—R. J. Guenther et al.

[57] ABSTRACT

In a folded optical resonator, in one arm of which a Brewster element is located, the tilted reflector and the Brewster element both introduce astigmatism into the system, which gives rise to resonator instability. The astigmatic effects can be made to counteract each other to a large extent with resonator stability thereby assured if the several parameters of the system are properly related to each other according to an equation for stability.

6 Claims, 3 Drawing Figures

PATENTED MAY 1 1973　　3,731,224

INVENTORS
A. DIENES
E. P. IPPEN
H. W. KOGELNIK
C. V. SHANK

BY David P. Kelley
ATTORNEY

COMPENSATED FOLDED RESONATOR

BACKGROUND OF THE INVENTION

This invention relates to resonators for optical devices and, more particularly, to three reflector folded resonators.

Three mirror folded resonators have been used heretofore in various types of modulation arrangements, high speed acoustic cavity dumping, and, as shown in the copending U. S. application of R. L. Kohn, Ser. No. 153,983, filed June 17, 1971, filed concurrently herewith, in a dye laser arrangement where both the pumping laser and the pumped laser are contained within the resonator. In all such applications, the folded cavity produces a small beam waist at the point of utility, e.g., the location of the pumped dye laser.

In a folded resonator, the curved reflector common to both legs of the resonator is necessarily tilted, and this tilting introduces astigmatism, that is, it results in different focal lengths of the tilted reflector in the two planes defining the beam cross section, which in turn results in different regions of resonator stability for the two planes.

The element within the resonator upon which the beam is focused, e.g., the acoustic modulator or the dye laser cell, is advantageously oriented at the Brewster angle, or has Brewster angle end windows, relative to the beam axis. The Brewster angle orientation produces effective optical distances which are different for the two planes, which also results in different regions of resonator stability. This effect can be so severe as to result in a totally unstable, and hence inoperative, system.

SUMMARY OF THE INVENTION

The present invention is based upon the discovery that the two effects discussed in the foregoing can be made to compensate each other to the extent that resonator stability is maximized. By resonator stability is meant the ability of the resonator to refocus the beam. The refocusing ability of an unstable resonator is insufficient to retain the beam within the resonator and it is, as a consequence, lost through the sides of the resonator.

In accordance with our invention, the thickness of the Brewster angle element and its index of refraction are precisely related to the radius of curvature of the tilted mirror and the angle of tilt thereof to produce maximum stability. Thus, in a folded resonator intracavity pumped dye laser, for example, where the mirror curvature and the index of refraction of the dye are fixed, the thickness of the dye element and the angle of the folded leg of the resonator, i.e., the angle of tilt of the mirror can be precisely determined to insure resonator stability.

DESCRIPTION OF THE DRAWINGS

The features and advantages of the present invention are apparent in the following detailed description and drawings, in which:

In FIG. 1 there is shown, for purposes of illustrating the principles of the invention, an intracavity dye laser system 11 of the type disclosed in the aforementioned R.H. Kohn application. System 11 comprises a pumping laser 12, which may be, for example, an argon ion laser operating at 4880 Angstrom units. Pumping power for laser 12 is supplied by a suitable power source, shown schematically as a battery 13 between an anode 14 and cathode 16.

Laser 12 is located in one arm of a folded resonator formed by curved reflectors 17, 18 and 19. Reflectors 17 and 18, which together form the arm in which laser 12 is located, are spaced a distance $d_2$ apart, while reflectors 18 and 19, which form the other arm of the resonator, are spaced a distance $d_1$ apart. The curvatures of reflectors 17, 18 and 19 are so chosen that between reflectors 17 and 18 the beam is substantially collimated, while between 18 and 19 it is focused to a very narrow waist approximately midway between the reflectors.

Figure 1:
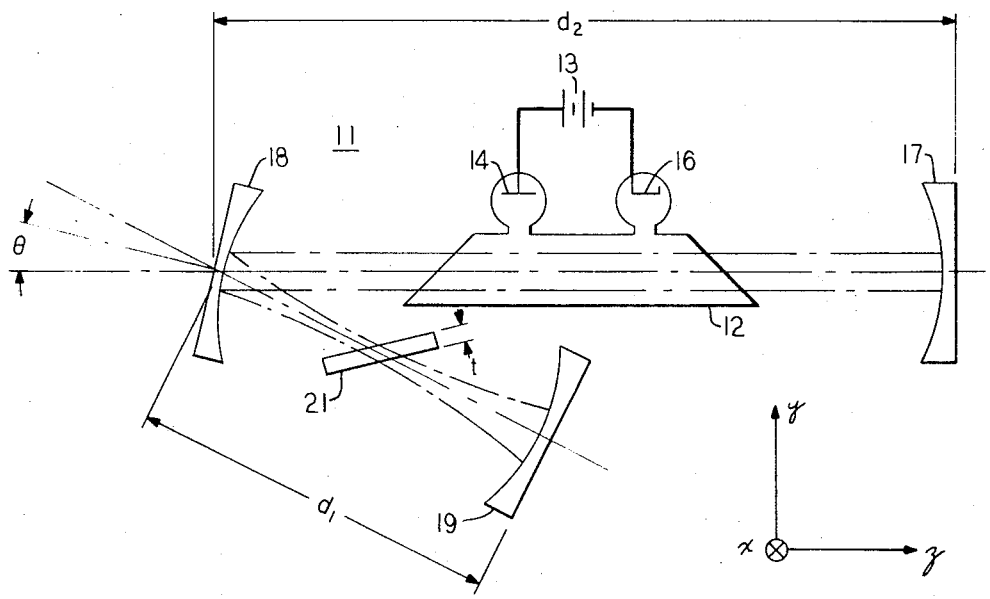
FIG. 1 is a schematic representation of an illustrative embodiment of the invention.

Located in the arm formed by reflectors 18 and 19 at the region of smallest beam waist is a dye laser cell 21 oriented at the Brewster angle to the axis of the beam in that arm of the resonator. The dye cell has a thickness $t$, as shown in FIG. 1, and an index of refraction $n$. The dye itself may be, for example, Rhodamine 6–G in water or methanol as a solvent. The cell itself may be formed, for example, of quartz or Pyrex flats having a channel through which the dye may flow. The cell windows, i.e., the flats, are as thin as possible to minimize the ellipticity of the beam.

The arrangement of FIG. 1 has several advantages over external pumping arrangements. The dye laser cell 21 is automatically aligned with the beam of the pumping laser 12, whereas in external pumping systems very accurate alignment and mode matching is necessary. Further, in an externally pumped arrangement, the dye concentration is adjusted to absorb substantially all of the incident pump light. Since absorption is exponential with distance, most of the heat due to absorption is generated close to the input window surface. This has, in the past, necessitated the use of such materials as sapphire for the input windows, and fast flow rates for the dye. In the arrangement of FIG. 1, the pumping power is in the form of a standing wave, hence the heat is generated substantially uniformly throughout the dye cell, permitting the use of such materials as quartz or Pyrex for the input windows, and reducing the flow rate requirements.

Despite these advantages, however, the folded cavity and the Brewster element, i.e., the dye cell, as discussed hereinbefore, create problems leading to resonator instability, and, in extreme cases, to total inoperativeness. Without the Brewster element, the limits of stability on $d_1$ are $$R_{19} + f_t - (f_t^2/R_{17} - d_2 + f_t) < d_1 < R_{19} + f_t + (f_t^2/d_2 - f_t) \quad (1)$$

where $R_{19}$ and $R_{17}$ are the radii of curvature of the reflectors 19 and 17 respectively, and the $f_t$'s are the focal lengths of tilted reflector 18. Since reflector 18 is tilted, its focal lengths in the $xz$ plane and the $yz$ plane are different, and are given by $$f_{xz} = (R_{18}/2)(1/\cos\theta) \quad (2)$$

$$f_{yz} = (R_{18}/2)\cos\theta \quad (3)$$

where $\theta$ is the angle between the axis of the arm $d_2$ and the normal to the face of reflector 18 that is, the axis of reflector 18, as shown in FIG. 1, i.e., the tilt angle, and $R_{18}$ is the radius of curvature of reflector 18. As can be seen in FIG. 1, $\theta$ is one half the angle between the two arms.

When a Brewster element is placed in the $d_1$ resonator arm, oriented as shown in FIG. 1, it causes effective "paraxial ray distances" as given by $$d_{1(xz)} = d_1 - 2t \sqrt{1/n^2+1} + t \sqrt{n^2+1/n^2} \quad (4)$$

$$d_{1(yz)} = d_1 - 2t \sqrt{1/n^2+1} + t \sqrt{n^2+1/n^4} \quad (5)$$

where $t$ is the thickness of the Brewster element and $n$ is its index of refraction. Thus it can be seen that the Brewster element produces an astigmatic effect as well as that produced by the tilted reflector 18, either one of which can produce resonator instability.

We have discovered that the two astigmatic effects can be made to compensate each other, and that such compensation, which is dependent upon a number of variables, can be expressed in mathematical form in such a manner that it becomes possible to produce a stable resonator by observing the limitations of the mathematical expression, which we have found to be $$\frac{R_{18}}{2} \left\{ \frac{1}{\cos\theta} - \cos\theta + \frac{R_{18}}{2} \cos^2\theta \left( R_{17} - d_2 + \frac{R_{18}}{2} \cos\theta \right)^{-1} \right.$$
$$\left. - \frac{R_{18}}{2} \frac{1}{\cos^2\theta} \left( R_{17} - d_2 + \frac{R_{18}}{2} \frac{1}{\cos\theta} \right)^{-1} \right\}$$
$$= t \frac{\sqrt{n^2+1}}{n^2} \left[ 1 - \frac{1}{n^2} \right]$$
(6)

From Equation (6) it can be seen that where one or more of the parameters $R_{17}$, $R_{18}$, $d_1$, $d_2$, $\theta$, $t$, and $n$ are fixed or predetermined, the remaining parameters can be readily determined to insure resonator stability. These equations hold for the Brewster element oriented as shown in FIG. 1, tilted about an axis perpendicular to the plane of the two resonator arms.

Figure 2A:
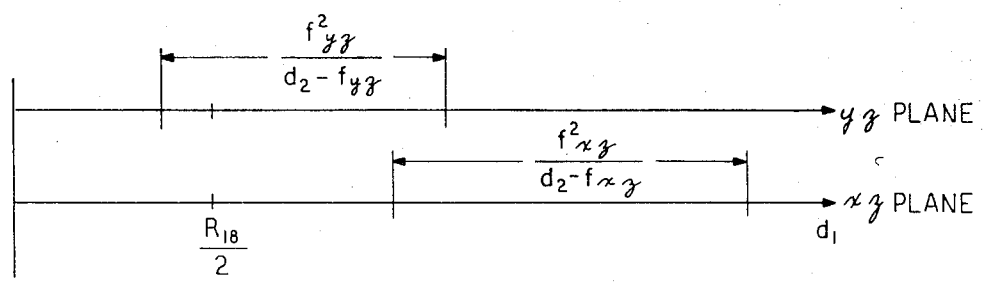
FIGS. 2A and 2B are diagrams illustrating the behavior of the embodiment of FIG. 1 under certain conditions.
Figure 2B:
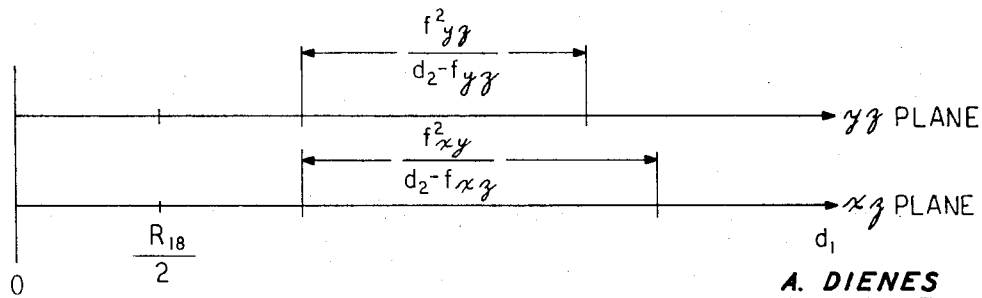

In FIG. 2 the stability relationships are shown for the case where $R_{17}$ is infinity, i.e., reflector 17 is flat. FIG. 2a illustrates the effect of reflector 18 tilt without the Brewster element in terms of the length $d_1$. The stability region in the yz plane and in the xz plane is given by the expression $$(f_i^2/d_2 - f_i) \quad (7)$$

from inequality (1), and the region of overlap of the two stability regions is the stability region for the resonator arm defined by $d_1$. As shown in FIG. 2a, there is a very limited range of $d_1$ wherein resonator stability is achievable. It is to be understood, of course, that it is possible that there would be, with all of the variables involved, instances where there would be no overlap and hence no resonator stability. FIG. 2b shows the effect of the addition of the Brewster element and the satisfaction of the terms of Equation (6). It can be seen in FIG. 2b that there is a large increase in the length of the overlap of the stability regions, which assures resonator stability. Thus the resonator is compensated, that is, compensation has been made for the effects of both mirror tilt and the Brewster element. As shown in FIG. 2b, the stability regions are not identical in length. Thus it is possible, for example, to move the smaller region within the limits of the larger region to improve beam focus without altering the overall stability.

In a dye laser arrangement such as disclosed in the aforementioned R. L. Kohn application, the thickness of the Brewster element dye cell was 0.3 cm., its index of refraction was 1.46, $R_{18}$ was 20 cm., and $\theta$ was 6.6°.

From the foregoing it is readily apparent that resonator stability can be assured if Equation (6) is satisfied, the result being a resonator compensated for the deleterious effects of both mirror tilt and the Brewster element. Similar results can be obtained with a folded resonator in which the pumping laser is outside the resonator.

What is claimed is:

1. An optical resonator comprising first, second, and third reflecting members, said first and second members defining a first light beam path and said second and third members defining a second light beam path at an angle to the first light beam path, said second member being curved and having different focal lengths in different planes, giving rise to different regions of stability in the resonator, an optically transmissive element between said second and third mirrors and oriented at the Brewster angle to the light beam path, thereby giving rise to differing stability regions in different planes, the angle between said first and second light beam paths being sufficient to produce a substantial matching of the stability regions for the different planes for the particular dielectric constant and thickness of said element, and the radii of curvature and separation of said first and second reflecting members, whereby the stability of said resonator is maximized.

2. An optical resonator as claimed in claim 7 wherein the radius of curvature of said first and second members, their separation, the dielectric constant and thickness of said element, and the angle between the light beam paths are related by $$\frac{R_2}{2} \left\{ \frac{1}{\cos\theta} - \cos\theta + \frac{R_2}{2} \cos^2\theta \left( R_1 - d_2 + \frac{R_2}{2} \cos\theta \right)^{-1} \right.$$
$$\left. - \frac{R_2}{2} \frac{1}{\cos^2\theta} \left( R_1 - d_2 + \frac{R_2}{2} \frac{1}{\cos\theta} \right)^{-1} \right\}$$
$$= t \frac{\sqrt{n^2+1}}{n^2} \left[ 1 - \frac{1}{n^2} \right]$$

where $R_2$ is the radius of curvature of said second member, $\theta$ is the angle between the first light beam path and the axis of said second member, $R_1$ is the radius of curvature of said first member, $d_2$ is the separation between said first and second members, $t$ is the thickness of said element, and $n$ is its dielectric constant.

3. An optical resonator as claimed in claim 7 wherein the radius of curvature of said first member is infinite and the radius of curvature $R_2$ of said second member and the angle $2\theta$ between the light beam paths are related to the thickness $t$ of said element and its dielectric constant $n$ by $$(R_2/2)(1/\cos\theta) - \cos\theta) = t\sqrt{n^2+1/n^2} (1-(1/n^2))$$

4. A laser system comprising an active laser medium, means for pumping said medium to generate an optical beam, first and second reflecting members defining a first resonator arm within which said active laser medium is coaxially located, a third reflecting member defining a second resonator arm with said second reflecting member, an optically transmissive element within said second resonator arm and oriented at the Brewster angle to the axis of said second arm, the radii of curvature of said first and second members, the length of said first resonator arm, the angle between said first and second resonator arms, the thickness of said element and its dielectric constant satisfying the relationship $$\frac{R_2}{2}\left\{\frac{1}{\cos\theta}-\cos\theta+\frac{R_2}{2}\cos^2\theta\left(R_1-d_2+\frac{R_2}{2}\cos\theta\right)^{-1}\right.$$
$$\left.-\frac{R_2}{2}\frac{1}{\cos^2\theta}\left(R_1-d_2+\frac{R_2}{2}\frac{1}{\cos\theta}\right)^{-1}\right\}$$
$$=t\frac{\sqrt{n^2+1}}{n^2}\left[1-\frac{1}{n^2}\right]$$

where $R_2$ is the radius of curvature of said second member, $\theta$ is the angle between the first light beam path and the axis of said second member, $R_1$ is the radius of curvature of said first member, $d_2$ is the separation between said first and second members, $t$ is the thickness of said element, and $n$ is its dielectric constant.

5. A laser system as claimed in claim 4 wherein said element is an active laser medium.

6. A laser system as claimed in claim 5 wherein the laser medium is a laser dye.

* * * * *